United States Patent
Rigouste

(10) Patent No.: US 11,466,599 B2
(45) Date of Patent: Oct. 11, 2022

(54) AIRCRAFT ENGINE LUBRICATION CIRCUIT AND METHOD, USING A NON-RETURN PRESSURISATION VALVE WITH TWO PLUGS

(71) Applicant: SAFRAN AIRCRAFT ENGINES, Paris (FR)

(72) Inventor: Jérôme Rigouste, Brunoy Finlande (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 970 days.

(21) Appl. No.: 16/014,252

(22) Filed: Jun. 21, 2018

(65) Prior Publication Data
US 2018/0371967 A1    Dec. 27, 2018

(30) Foreign Application Priority Data
Jun. 22, 2017 (FR) ..................... 17 55721

(51) Int. Cl.
*F01M 1/10* (2006.01)
*F16K 17/04* (2006.01)
(Continued)

(52) U.S. Cl.
CPC .............. *F01M 1/10* (2013.01); *F01D 17/06* (2013.01); *F01D 17/105* (2013.01);
(Continued)

(58) Field of Classification Search
CPC .... F01M 1/10; F01M 1/16; F01M 2001/1085; F16K 17/04; F16K 17/044; F16K 17/0473; F01D 25/18
See application file for complete search history.

(56) References Cited

U.S. PATENT DOCUMENTS 3,451,416 A * 6/1969 Nyberg ............... F16K 17/0473
                                                                137/115.18
2013/0205745 A1* 8/2013 Detry .................... F16K 17/046
                                                                60/39.08
(Continued)

FOREIGN PATENT DOCUMENTS

DE         19630212 C1     7/1997
EP          1350551 A1    10/2003

OTHER PUBLICATIONS

Search Report issued in French Patent Application No. 1755721 dated Mar. 9, 2018.

*Primary Examiner* — Michael R Mansen
*Assistant Examiner* — Mark K Buse
(74) *Attorney, Agent, or Firm* — Pearne & Gordon LLP

(57) ABSTRACT

A non-return valve with twin plugs is connected to a fluid reservoir and equipment that can receive a small overflow quantity essentially in the gaseous state from the reservoir. This occurs when the primary valve is open. In the case of a larger overflow essentially in the liquid state, the openings are switched over to evacuate the overflow to another outlet branch of the non-return valve, without it being transferred to the equipment. The invention is useful in an oil lubrication circuit, in which a hypothetical fuel leak into the oil could cause the oil reservoir to overflow into the non-return valve and in which a significant flow of liquid to the equipment must be avoided; oil outlet through the other branch of the outlet can remain in a reservoir provided with a drain system.

9 Claims, 5 Drawing Sheets

(51) Int. Cl.
*F01M 1/16* (2006.01)
*F16K 11/10* (2006.01)
*F01D 17/10* (2006.01)
*F02C 7/14* (2006.01)
*F01D 25/18* (2006.01)
*F02C 7/06* (2006.01)
*F01D 17/14* (2006.01)
*F01D 17/06* (2006.01)

(52) U.S. Cl.
CPC ............ *F01D 17/145* (2013.01); *F01D 25/18* (2013.01); *F01M 1/16* (2013.01); *F02C 7/06* (2013.01); *F02C 7/14* (2013.01); *F16K 11/105* (2013.01); *F16K 17/044* (2013.01); *F16K 17/046* (2013.01); *F16K 17/0473* (2013.01); *F01M 2001/1085* (2013.01); *F05D 2260/941* (2013.01); *F05D 2260/98* (2013.01); *F05D 2270/3011* (2013.01)

(56) References Cited

U.S. PATENT DOCUMENTS

| | | | |
|---|---|---|---|
| 2013/0319798 A1* | 12/2013 | Sheridan | F16K 15/04 184/6 |
| 2016/0305562 A1* | 10/2016 | Kagomoto | F16K 17/04 |
| 2018/0371967 A1* | 12/2018 | Rigouste | F01M 1/10 |
| 2019/0178119 A1* | 6/2019 | Karcher | F16N 13/22 |

* cited by examiner

AIRCRAFT ENGINE LUBRICATION CIRCUIT AND METHOD, USING A NON-RETURN PRESSURISATION VALVE WITH TWO PLUGS

The subject of the invention is an aircraft engine lubrication circuit and method, using a non-return pressurisation valve with two plugs.

Non-return valves with two plugs can already be found in aircraft engine lubrication devices, in which they are installed on a lubrication circuit that they contribute to maintaining at a constant pressure. A first of the plugs is a pressurisation plug, that is calibrated to open as soon as a first overpressure threshold is reached in a portion upstream from the non-return valve, into an overflow conduit that evacuates the oil overflow to another location in the lubrication circuit; like a gearbox connected to engine auxiliary equipment (pumps, alternators, etc.). This pressurisation plug is typically designed to episodically release small quantities of oil in the vaporised state, or in emulsion in air. The portion of the oil circuit located immediately upstream from the non-return valve is often a reservoir located on the lubrication circuit, in which a volume of oil resides temporarily before circulating once again in other parts of the circuit, and the role of which is to absorb lubrication flow oscillations. The valve opens up at the top of the reservoir that is normally occupied by a two-phase volume of air and oil droplets in emulsion in air or by oil vapour. When the pressure in the reservoir increases, this two-phase mixture or this vapour is rejected by opening the first plug in the non-return valve, and it ends up in the gear box, therefore at least temporarily increasing the amount of oil that lubricates its content by a small quantity.

The second plug performs a similar overflow evacuation role but opens up under different conditions, at a higher overpressure threshold, essentially to release air with a high oil content or even pure liquid oil in the case of an abnormal pressure rise. It is typically designed to evacuate larger fluid flows than the first plug. This situation occurs under exceptional circumstances and in the case of operating anomalies. For example, it can occur in devices in which the oil circuit comprises a heat exchanger designed to prevent overheating of the lubrication oil, while heating another fluid such as engine fuel. If there is a rupture of the heat exchanger tubes, fuel at higher pressure can then escape into the oil circuit and quickly accumulates with oil in the reservoir, filling it completely, which forces the second plug of the non-return pressurisation valve to open and allows the passage of a possible large quantity of oil, therefore possibly mixed with fuel or another liquid, into the gear box downstream from the non-return valve.

A large quantity of oil thus evacuated to the gearbox or other equipment through the open non-return pressurisation valve usually has harmful consequences, without mentioning the consequences of mixing with another fluid: bearings lubricated by an excessive quantity of oil are overheated and can be damaged; the engine can be extinguished in the case of the gearbox of auxiliary electricity generation equipment that can be reached by the liquid; and the pressure inside this lubricated chamber and in adjacent portions of the circuit also increases, with the possibility of a pressure inversion, oil back flow or dissemination of this oil elsewhere into the machine.

Documents DE 19630212 C1 and EP 1350551 A1 reveal such valves with two plugs that open at different pressure thresholds.

One purpose of the invention is to improve such lubrication circuits containing non-return valves with two plugs to prevent the consequences of a rejection of an excessive liquid flow through the non-return valve when the second plug is open, but without excessively modifying known devices that are satisfactory in other aspects. A first aspect of the invention is a lubrication circuit in which the valve connectors are modified to eliminated excessive irruptions of oil or other liquids into the chamber (gearbox or other); and another aspect of the invention is a method of lubricating an aircraft engine in operation depending on the characteristics of this circuit.

In a general form, the first aspect of the invention is a lubrication oil circuit for an aircraft engine, a lubrication oil circuit for an aircraft engine, the circuit comprising a non-return valve comprising a case fitted with a connector on an upstream side and an outlet on a downstream side, oil supply on said upstream side of the non-return valve a first valve plug and a second valve plug housed in a manner free to move in the body to open and to create a communication between the connector and the outlet, when a first overpressure threshold is reached on the upstream side for the first valve plug; and when a second overpressure threshold on the upstream side higher than the first threshold is reached, for the second valve plug, in which the outlet comprises two branches, a first branch leading to a chamber to be lubricated remaining open at least up to the second overpressure threshold, and a second branch, a switching device that opens the second branch when the second overpressure threshold is reached, the second branch of the outlet leading to an evacuation out of the circuit.

The switching device, combined with the division of the outlet into two branches, can carry the overflow elsewhere, outside the usual chamber once the second valve plug has been opened. The overflow can be discarded outside the machine, or more judiciously drained to a reservoir in which it can remain before being recovered during a maintenance operation. Operation of the non-return valve remains unchanged below this second overpressure threshold, and until switching takes place the overflow (if any) still reaches the chamber, for the first branch of the outlet, in very small quantities that are not sufficient to be harmful.

The synchronisation device can advantageously control closure of the first branch of the spacer when the second overpressure threshold is reached, but this is not necessary as long as the flow in the first branch remains moderate under all circumstances.

In particular, the non-return valve may be of the type in which the first valve plug is placed across the second valve plug that has a much larger radius and therefore a higher evacuation flow rate.

In some embodiments, the switching device may be an element of the second valve plug, so that opening of this valve plug and switching of the flow between the two branches of the outlet can be synchronised perfectly; such an embodiment of the switching device consists of a sleeve extending in the direction of movement of the second valve plug and comprising two staged openings in this direction, and the branches of the outlet comprising openings also staged in this direction, a first of the sleeve openings prolonging the opening of the first branch when the second valve plug is closed, and a second of the sleeve openings prolonging the opening of the second branch when the second valve plug is opened; switching is then perfect, since the first branch of the outlet closes when the second opens, at exactly the second overpressure threshold.

In another envisaged embodiment, the switching device comprises a third valve plug that opens the second branch when the second overpressure threshold has been reached, the first branch being controlled by a gas flow calibration orifice, with a smaller passage section than the second branch.

In this case, imperfect switching is accepted because the first branch of the outlet remains open under all circumstances; nevertheless, it is designed to allow much lower fluid flows than the other, such that all or almost all of the evacuation flow will pass through the second branch of the outlet, when the second valve plug is open. This device can have some advantages such as easier manufacturing, the valve plugs zone thus remaining unchanged from known designs, all that changes is a peripheral outlet portion in the non-return valve.

As has already been seen, one particularly interesting application is characterised in that the chamber to be lubricated is a case of a gearbox in which shafts rotate on bearing blocks; and in that the chamber to be lubricated is a gearbox supporting engine auxiliary equipment.

As has already been mentioned, the invention is particularly useful if the circuit comprises a heat exchanger with another fluid on the upstream side of the non-return valve.

Another aspect of the invention is a method of lubricating an aircraft engine by an oil circuit conforming with the above comprising a pressure limitation of an oil circuit by means of a non-return valve by extraction of an overflow and a flow from the overflow to equipment to be lubricated, characterised in that when an overpressure threshold is reached in the circuit, it comprises opening of an evacuation outside the circuit and the equipment and switching of the non-return valve to direct at least most of the overflow towards the evacuation, The different aspects, characteristics and advantages of the invention will now be described more fully in the detailed description of embodiments given below for purely illustrative purposes, and therefore that are not mutually exclusive, with reference to the appended figures:

Figure 3A:
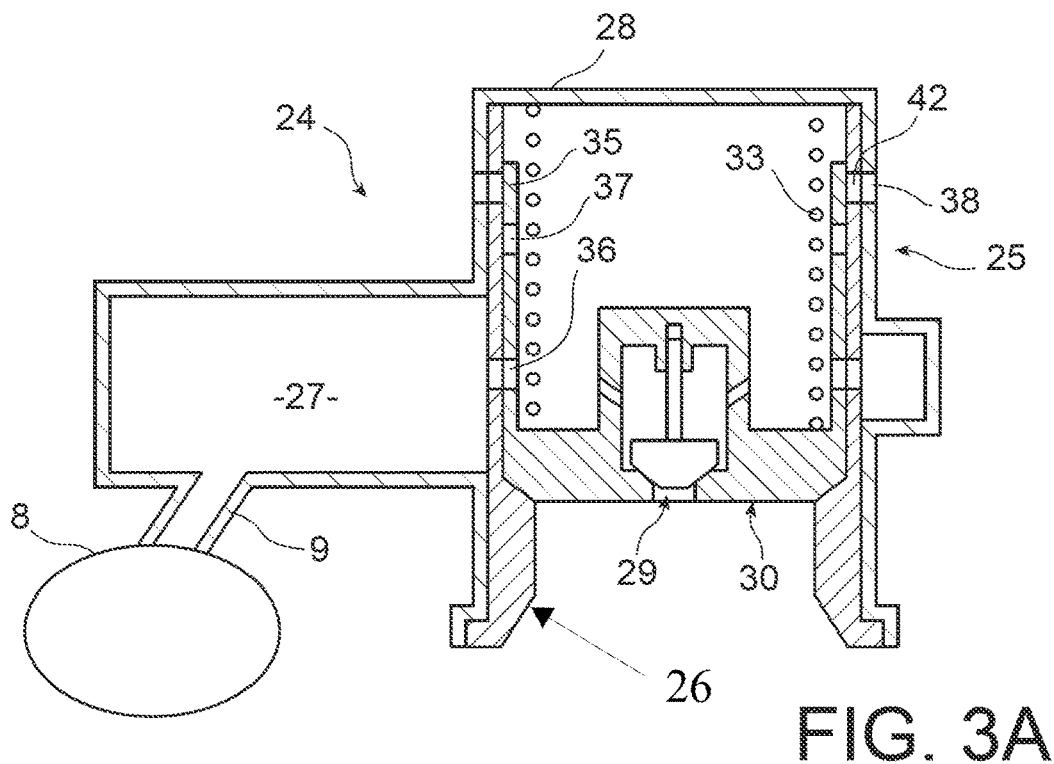
FIGS. 3A, 3B and 3C represent a twin-plug non-return valve according to the invention in its three states.
Figure 3B:
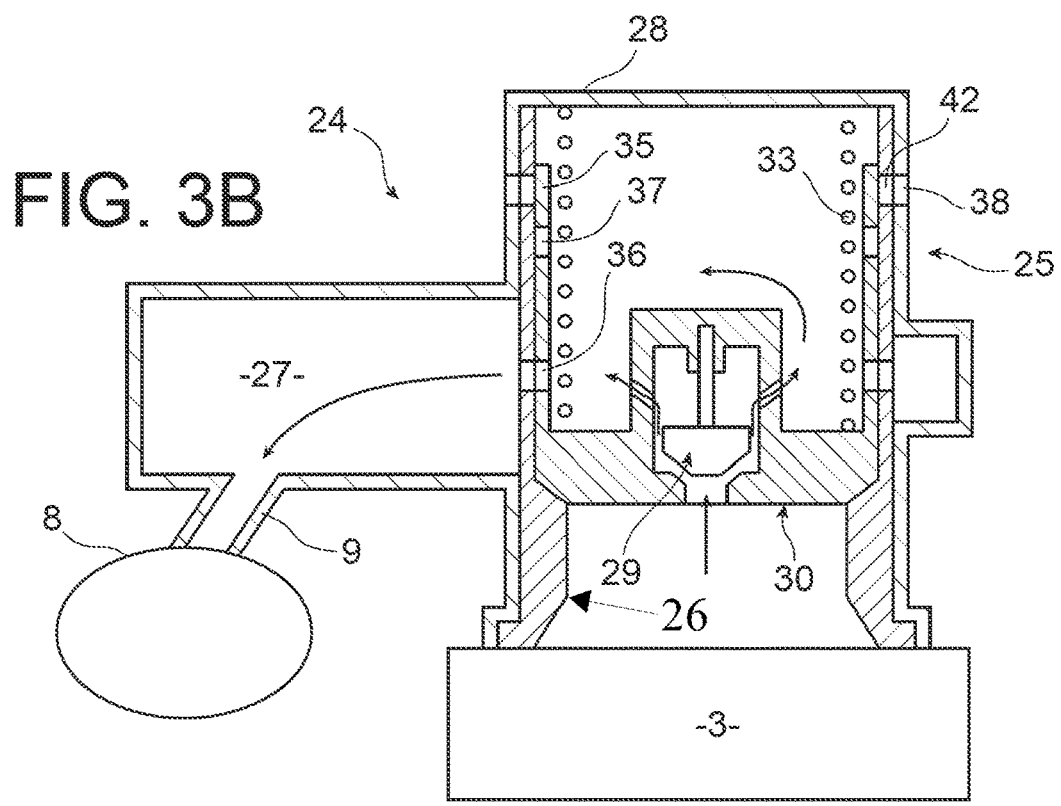
Figure 3C:
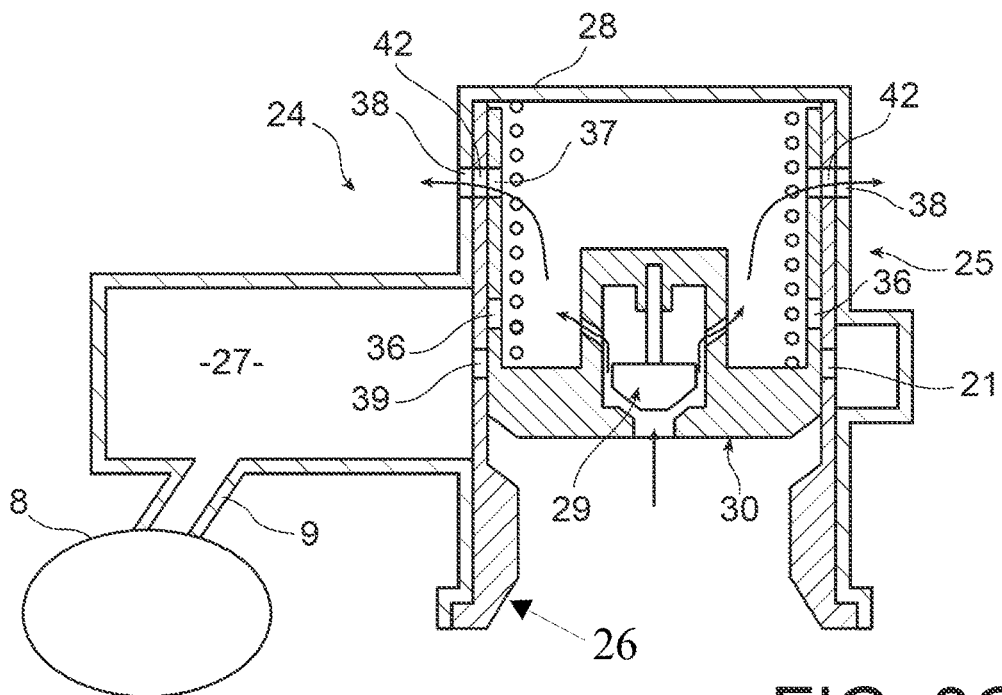
Figure 4:
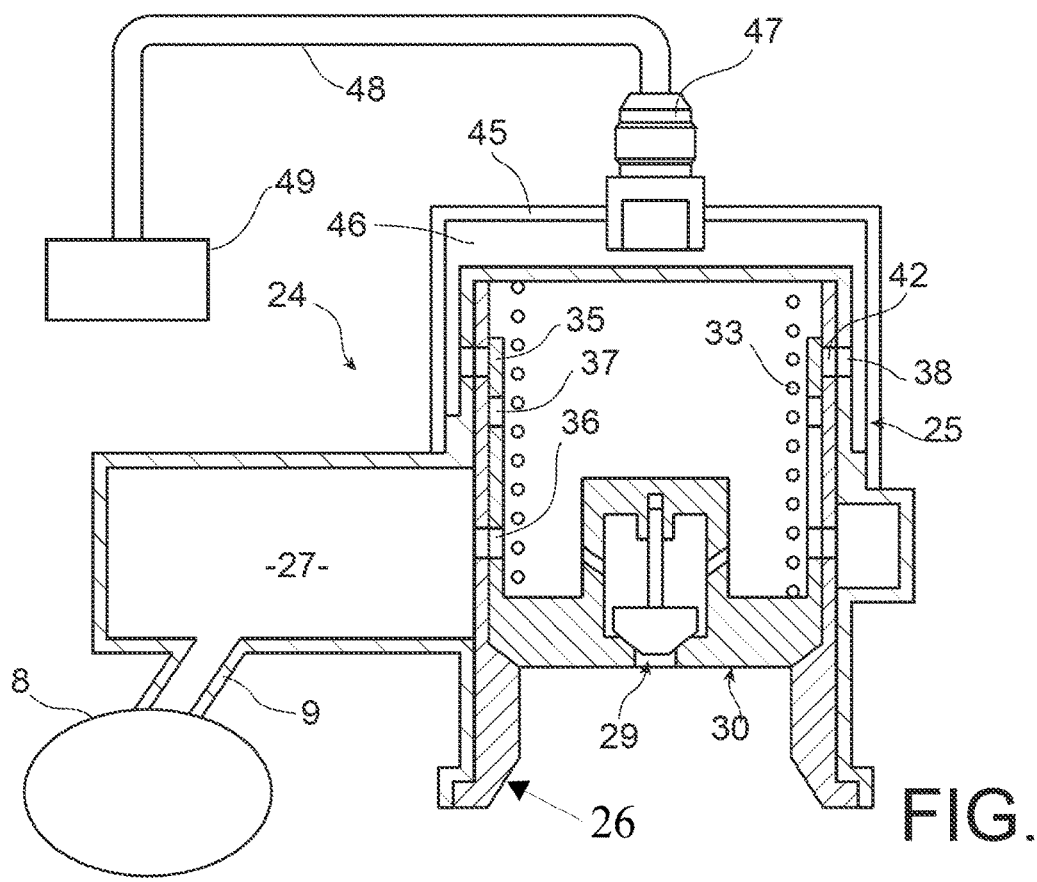
FIG. 4 represents a second possible embodiment of the non-return valve according to the invention.
Figure 6:
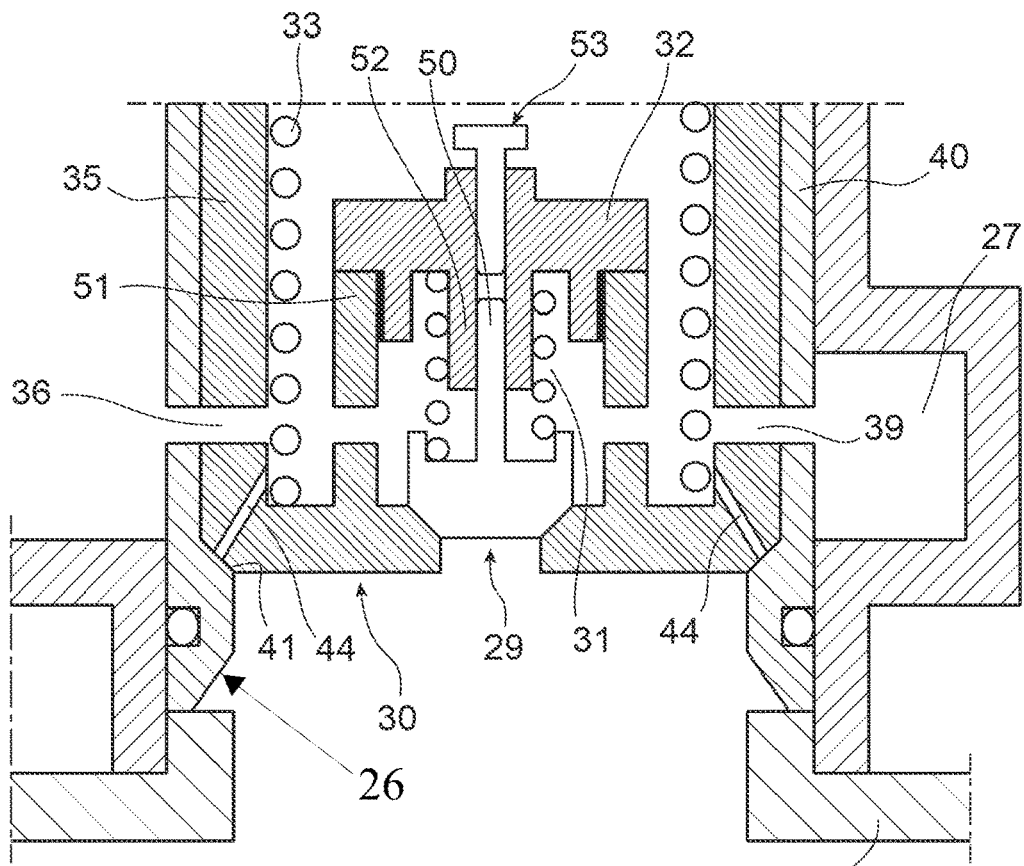

and FIG. 6 is a larger-scale detail of valve plugs for the embodiments in FIGS. 3 and 4.

Figure 1:
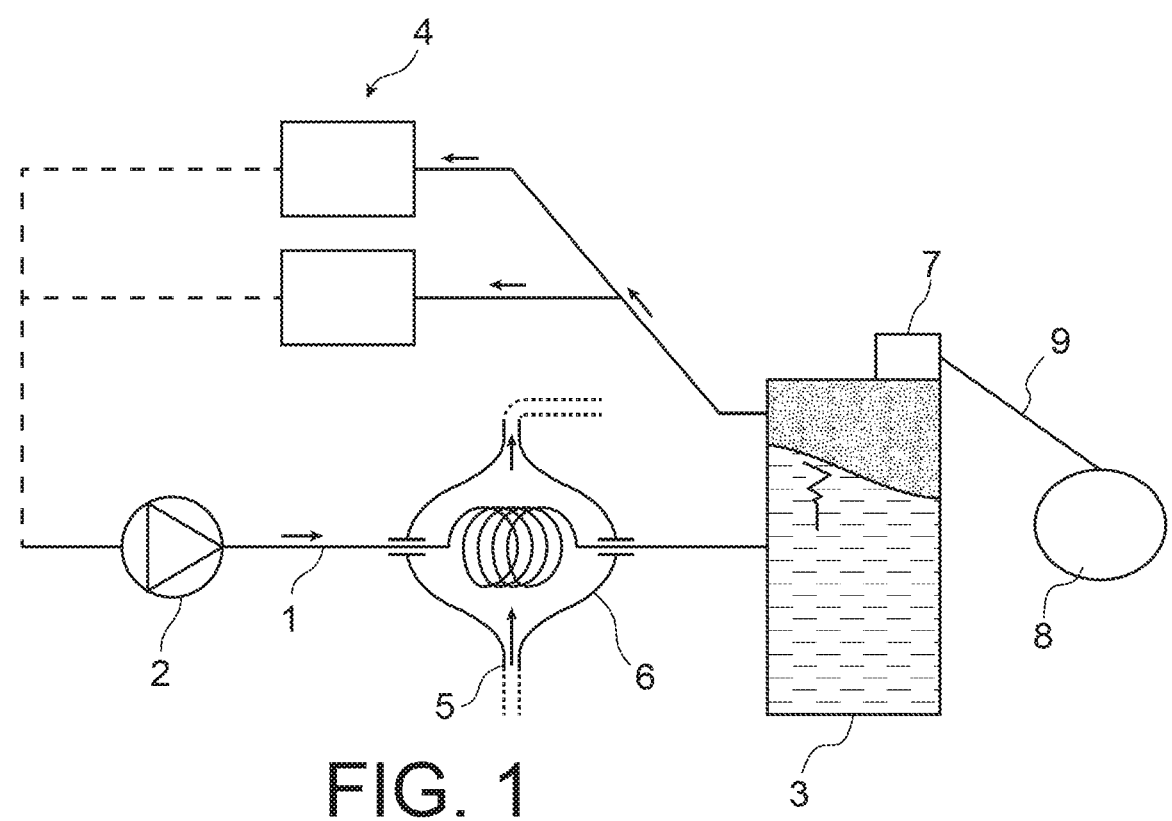
FIG. 1 illustrates an aircraft engine lubrication circuit.

FIG. 1 very diagrammatically shows an oil circulation device in an aircraft engine. A pipe 1 transports oil by means of an oil supply pump 2 to a reservoir 3, and then to various equipment 4 to be lubricated. The oil is mainly in the form of a fog or vapours in air, however there is always a liquid content in the bottom of the reservoir 3. In this type of lubrication circuit, the reservoir 3 is an oil transit reservoir located on the circuit, with a variable oil level depending of flow oscillations, but that is only partially filled with oil under normal conditions. The pipe 1 intersects a fuel supply pipe 5 at the location of a heat exchanger 6, so as to limit overheating of the oil and to heat the fuel to make combustion more efficient. As mentioned above, a rupture of tubes in the heat exchanger 6 would cause an irruption of fuel into the pipe 1 and then into the reservoir 3, with the risk of the reservoir overflowing accompanied by an overpressure. The reservoir overflow is evacuated through a non-return valve 7 located at the top of the reservoir, that is designed to carry gas and not liquid, and that is also connected to an auxiliary equipment gearbox 8 through a gas evacuation pipe 9 leading downwards designed to assure that oily air under pressure is evacuated to the gearbox 8.

Figure 2:
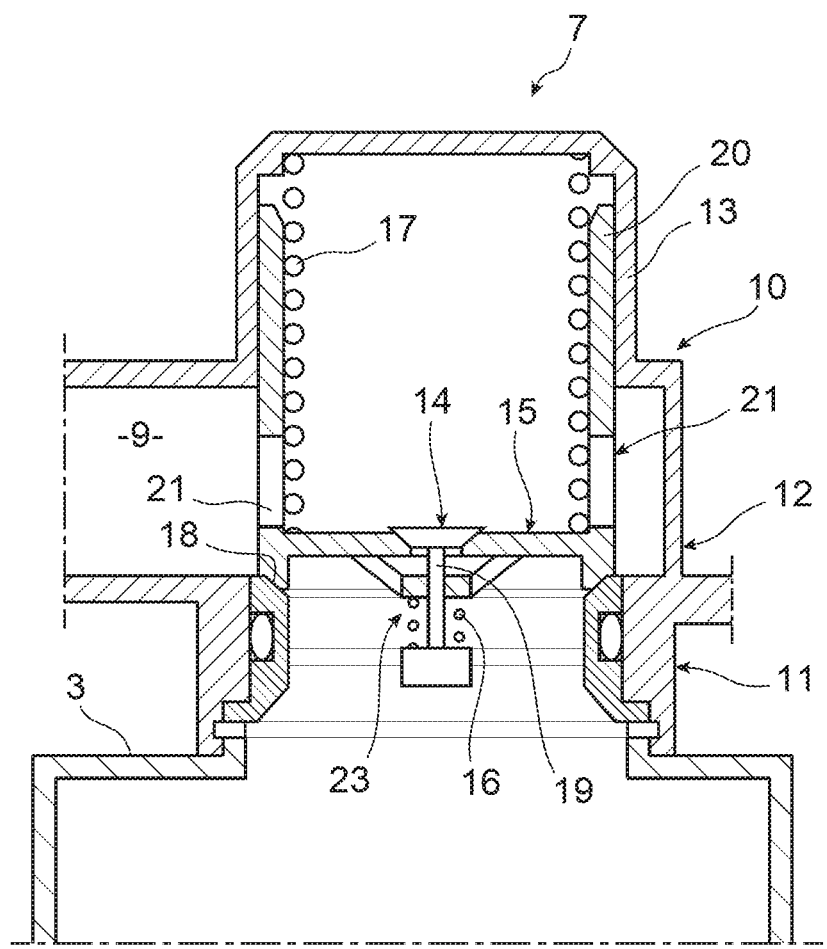
FIG. 2 represents a twin-plug non-return valve that cannot solve the problem.

FIG. 2 illustrates a twin-plug non-return pressurisation valve 7 based on a known design of a twin-plug device, the operating principle of which is known in prior art. As explained below, such a non-return valve is not satisfactory for solving the particular problem described above, and the invention discloses a different construction of a non-return pressurisation valve incorporating two plugs based on the same principle.

The non-return valve 7 comprises a case 10 that forms its enclosure and on which a connector 11 can be seen leading to the reservoir 3 on the upstream side, with an outlet 12 on the downstream side, and an upper dome 13 above the outlet 12, that is itself above the connector 11. The case 10 contains a first plug or primary plug 14 and a second plug or secondary plug 15; the primary plug 14 is small and is formed through the second plug 15, and follows the same direction of movement, towards the top of the figure, in case of overflow in the reservoir 3. The primary plug 14 is calibrated by a first spring 16 compressed between the plug and a seat 23 on the lower face of the secondary plug 15, that is calibrated by a second spring 17 compressed between an upper face of its closer and the top of the dome 13. When there is no overpressure, the closer of the primary plug 14 bears on the closer of the secondary plug 15 that therefore acts as a seat for it, and a portion of the connector 11 acts as a seat for the closer of the secondary plug 15. Clearance is provided between the stem 19 of the primary plug 14 and a drilling in the secondary plug 15 in which this stem 19 can slide, to enable evacuation of the overflow from the reservoir 3 through this clearance passing through the closer of the secondary plug 5 when the primary plug 14 opens. The secondary plug 15 comprises an upper sleeve 20 such that it can slide inside the dome 13 while being guided in its movements. The upper sleeve 20 is provided with openings 21 that communicate with the outlet 12, that is an annular volume into which the gas outlet duct 8 leads. And the stem 19 of the primary plug 14 is guided by sliding in a perforation in the bearing surface 23.

When an overpressure occurs in the tank 3, the different calibrations of the springs 16 and 17 are such that the primary plug 14 opens first. Since its surface area is much smaller than the secondary surface area 15, it results in a small opening of the reservoir 13, sufficient to absorb episodic pressure increases by evacuating small oil fog or vapour flows, that pass firstly into the volume surrounded by the dome 13 and the upper sleeve 20, before flowing into the outlet 12 through the openings 21 and then into the gas evacuation duct 9 towards the gearbox 8 in which the pressure is lower than it is in the reservoir 3. If the reservoir 3 is overfilled, the secondary plug 15 also opens and the overflow, essentially liquid, flows in the outlet 12 and then once again in the gas evacuation duct 9. Excess lubricant or fuel-lubricant mixture can then occur in the gearbox 8. The gearbox is provided with an upper orifice through which oily air can pass without allowing liquid oil to pass, that can therefore accumulate in the gearbox 8 with the risk of causing damage if the quantity is too large.

FIGS. 3 (A, B and C) and the enlargement in FIG. 6 illustrate the different states of a first embodiment of the invention. The non-return valve has the general reference 24 and comprises main constituents resembling the constituents of non-return valve 7 described above with reference to FIG. 2, but with modifications to some details; there is a case 25 comprising a connector 26 to the reservoir 3 at one end, an annular outlet 27 leading to the overflow pipe 9 at the other end, an intermediate dome 28 above the outlet 27 and the connector 26, a primary plug 29 and a secondary plug 30 housed in the case 25 and free to move in a common opening direction, a calibration spring 31 compressed between the closer of the primary plug 29 and a bearing 32 depending on the secondary plug 30, another spring 33 compressed between the closer 34 of the secondary plug 30 and the top of the case 25, the dimensions of the primary plug 29 being much smaller than the dimensions of the secondary plug 30 and mounted on it, and the springs 31 and 33 being chosen to yield and enable the opening of plugs 29 and 30 respectively at different overpressure thresholds in the reservoir 3.

The most important differences between the non-return valve 7 described above and this one (24) are described below. The secondary plug 30 is provided with an upper sleeve 35, that comprises not only openings 36 at the height of the outlet 27, but also other openings 37 staged with the previous openings and extending above them. There are openings 38 formed in the dome 25 that can prolong the upper openings 37. The entry into the outlet 27 takes place through openings 39 that can prolong the lower openings 36 in the sleeve 35; and the evacuation from the overflow when the secondary plug 30 is open no longer passes around the closer 34 when it is open, but along the same path as the path followed when only the primary plug 28 is open, between the closer of the primary plug and the closer 34 of the secondary plug 30.

These modifications can be achieved by adding a cylindrical part called a bushing 40, acting as an internal liner for the case 25, extending vertically between the top of the dome 28 and the connector 26 to the reservoir 3, and inside which the secondary plug 30 can slide. The lower part of the bushing 40 comprises a seat 41 on which the closer 34 of the secondary plug 30 rests when this plug is closed, the openings 39 that prolong the lower openings 36 of the sleeve 35 when the secondary plug 30 is closed, and upper openings 42 that can have the same dimensions and the same positions as the openings 38 in the dome 28 and therefore prolong them.

The staging of the openings 36 and 37 on the upper sleeve 35 is chosen such that the upper openings 37 do not prolong the openings 38 and 42 in the dome 28 and the bushing 40 when the secondary plug 30 is closed. Therefore in the state shown in FIG. 3A, that shows the case in which there is no overpressure in the reservoir 3 and the plugs 29 and 30 are closed, these plugs separate the volume of the reservoir 3 and the connector 26 of the outlet 27 and the gas evacuation duct 9, and the internal volume in the dome 28 communicates with the outlet 27 due to the alignment in this case of openings 36 and 39, but it remains isolated from the exterior because the openings 37 are not aligned with openings 38 and 42.

A moderate overpressure in the reservoir 3 opens the primary valve 29 (FIG. 3B) and, as before, enables evacuation of an overflow through the clearance 43 present between the primary plug 29 and the closer 34 of the secondary plug 30, and the overflow flows into the outlet 27 through the openings 36 and 39, then into the gas evacuation duct 9 as before.

And when a higher pressure occurs and forces the secondary plug 30 to open, the lower openings 36 and 39 are no longer aligned, but the upper openings 37, 38 and 42 prolong them and the overflow passes through these openings to escape from the non-return valve 24 and flow to the exterior. Nothing then reaches the outlet 27 nor the gas evacuation duct 9 and the box 8, thus preventing them from becoming overfilled with lubricant and possibly other fluids.

Some comments can be made.

The overflow also passes through the clearance 43 when the secondary valve 30 is open, leak tightness being maintained by the bushing 40 and the sleeve 35, such that the clearance 43 must be sized to enable satisfactory evacuation even in the case of high flow from the overflow. Perforations 44 can pass through the closer 34 between the seat 41 and the upper face, if a higher flow is necessary. The main function of the secondary plug 30 becomes a switching function between a first branch of the outlet, comprising lower openings 39 and leading to the gas evacuation duct 9 through the traditional outlet 27, as before, and a second outlet branch comprising openings 38 and 42 and leading elsewhere, to the undifferentiated exterior of the non-return valve 24 if this is allowable or to any drain, in any case leaving the lubrication circuit and thus preventing excessive filling. The embodiment in FIG. 4 can then be adopted, that is different from the previous embodiment in that a cap 45 is added to the dome 28 that leaves an intermediate volume 46 between them, into which the openings 38 lead. The cap 45 is provided with an upper nipple 47 to which an overflow evacuation duct 48 can be connected, that leads to a drainage reservoir 49 in which excess fluid can be kept, possibly stagnant, until it is recovered later during a maintenance operation in which a reservoir drain system 49 is used. The remaining part of the device in FIG. 3 is unchanged.

Some construction details can also be mentioned. In this case the stem 50 of the primary plug 29 is located above the closer, surrounded by the upper sleeve 35 and only one side of the closer 34 of the secondary plug 30, so that the opening of the closer 34 can be completely exposed, and when necessary a larger flow can be obtained through the non-return valve 24, due to a large clearance 43. The bearing 32 is raised above the closer 34 by a discontinuous support 51 surrounding the primary plug 29. It comprises a sleeve 52 at its lower face to guide the stem 50 and an adjustment nut 53 passing through it to limit the upwards opening movement of the primary plug 29.

Figure 5:
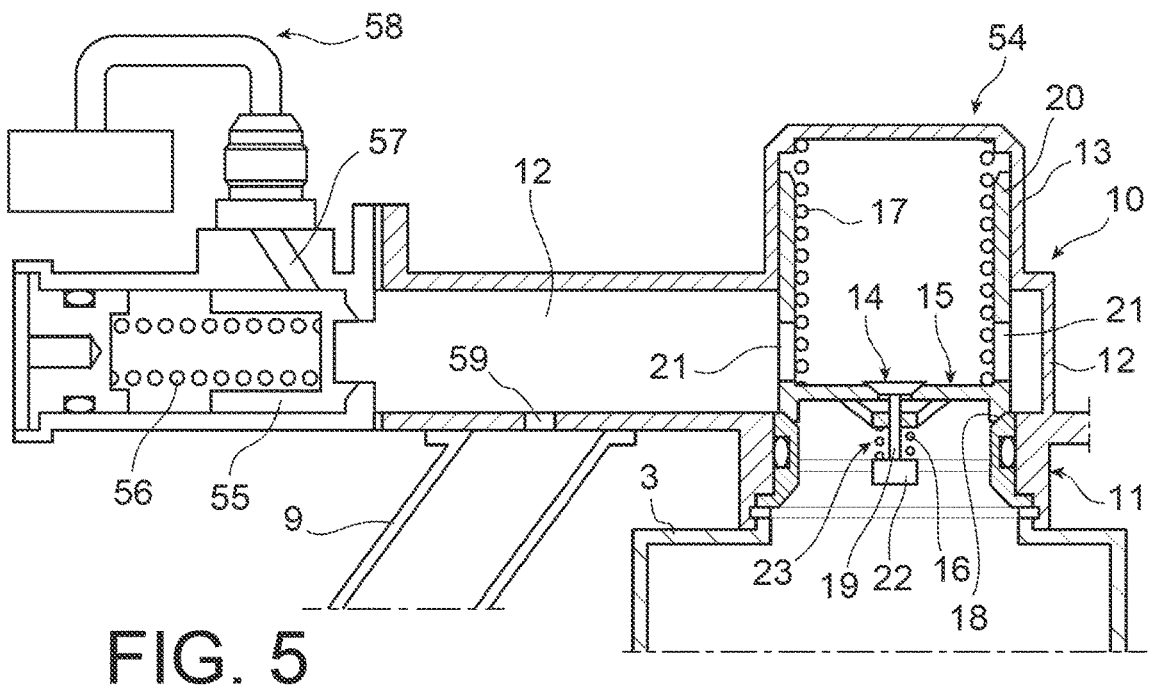
FIG. 5 represents a third embodiment.

Another possible embodiment of the invention will be described with reference to FIG. 5. The connection and plugs of the non-return valve 54 illustrated on this figure are not necessarily innovative and therefore they can be similar to those in FIG. 2, but a third plug 55 is installed at the location of the outlet 12, calibrated by a third spring 56 and that is capable of exposing an opening 57 of the outlet 12 as it opens, leading to the exterior, or to a nipple 58 and a reservoir device similar to that in the embodiment in FIG. 4, depending on the preference. Furthermore, the outlet 12 communicates with the gas evacuation duct 9 through a small diameter gas flow calibration orifice 59. Operation is then as follows, the third spring 56 being chosen to yield at the same overpressure threshold in the reservoir 3 as the spring 17 of the secondary plug 15, or at a similar value.

Therefore when the primary plug 14 opens, the third valve 55 remains closed and pressurised gases enter the outlet 12 before flowing in a gas evacuation duct 9 through the calibration orifice 59; this is possible because the overflow flow is then small and is essentially gaseous, therefore under flow conditions compatible with the passage through the calibration orifice 59.

And when the secondary plug 15 opens; the calibration orifice 59 can no longer evacuate the fluid overflow flow that is much larger, especially if this fluid is essentially in the liquid state as it is in the case of a fuel leak into the oil. However, the third valve 55 will open and the liquid overflow will exit through the outlet 12 through the opening 57, once again providing perfect or almost perfect switching between the two branches of the outlet 12, in this case including the calibration orifice 59 and the opening 57.

The invention claimed is:

1. An aircraft engine lubrication oil circuit, the circuit comprising:
    a non-return valve comprising a case fitted with a connector on an upstream side and an outlet on a downstream side,
    an oil supply on said upstream side of the non-return valve,
    a first valve plug and a second valve plug housed in a manner free to move in the case to open and to create a communication between the connector and the outlet, when a first overpressure threshold is reached on the upstream side for the first valve plug; and when a second overpressure threshold on the upstream side higher than the first threshold is reached, for the second valve plug,
    in which the outlet comprises two branches, a first branch leading to a device to be lubricated remaining open at least up to the second overpressure threshold, and a second branch,
    a switching device that opens the second branch when the second overpressure threshold is reached,
    the second branch of the outlet connected to an exterior of the circuit.

2. The aircraft engine lubrication oil circuit according to claim 1, wherein the switching device comprises an element of the second plug comprising a first opening prolonging an opening of the first branch when the second plug is closed, and not prolonging said opening of the first branch when the second plug is open.

3. The aircraft engine lubrication oil circuit according to claim 2, wherein the switching device consists of a sleeve extending in the direction of movement of the second plug and comprising two openings, including the first opening, staged in this direction, and a second of the openings in the sleeve prolonging an opening in the second branch when the second plug is open.

4. The aircraft engine lubrication oil circuit according to claim 1, wherein the switching device comprises a third valve plug that opens the second branch when the second overpressure threshold has been reached, the first branch being controlled by a gas flow calibration orifice, with a smaller passage section than the second branch.

5. The aircraft engine lubrication oil circuit according to claim 1, wherein the device to be lubricated is an engine auxiliary equipment gearbox.

6. The aircraft engine lubrication oil circuit according to claim 5, further comprising a heat exchanger on the upstream side of the non-return valve.

7. The aircraft engine lubrication oil circuit according to claim 1, wherein the circuit is evacuated to an exterior of the non-return valve.

8. The aircraft engine lubrication oil circuit according to claim 1, wherein the evacuation from the circuit uses a reservoir.

9. A method of lubricating an aircraft engine lubrication oil circuit, the circuit comprising:
    a non-return valve comprising a case fitted with a connector on an upstream side and an outlet on a downstream side,
    an oil supply on said upstream side of the non-return valve,
    a first valve plug and a second valve plug housed in a manner free to move in the case to open and to create a communication between the connector and the outlet, when a first overpressure threshold is reached on the upstream side for the first valve plug; and when a second overpressure threshold on the upstream side higher than the first threshold is reached, for the second valve plug,
    in which the outlet comprises two branches, a first branch leading to a device to be lubricated remaining open at least up to the second overpressure threshold, and a second branch,
    a switching device that opens the second branch when the second overpressure threshold is reached,
    the second branch of the outlet connected to an exterior of the circuit, the method comprising a pressure limitation of the oil circuit by means of the non-return valve by extraction of an overflow and a flow from the overflow to the device to be lubricated, wherein when an overpressure threshold is reached in the circuit, the method comprises opening of the evacuation outside the circuit and said chamber and switching of the non-return valve to direct at least most of the overflow towards the evacuation.

* * * * *